United States Patent [19]

Franaszek

[11] Patent Number: 4,488,142
[45] Date of Patent: Dec. 11, 1984

[54] APPARATUS FOR ENCODING UNCONSTRAINED DATA ONTO A (1,7) FORMAT WITH RATE $\frac{2}{3}$

[75] Inventor: Peter A. Franaszek, Katonah, N.Y.

[73] Assignee: International Business Machines Corporation, Armonk, N.Y.

[21] Appl. No.: 336,488

[22] Filed: Dec. 31, 1981

[51] Int. Cl.³ .......................................... H03K 13/24
[52] U.S. Cl. ................................ 340/347 DD; 360/40
[58] Field of Search ............... 340/347 DD; 235/310, 235/311; 360/39, 40, 41, 42

[56] References Cited

U.S. PATENT DOCUMENTS

| | | | |
|---|---|---|---|
| 3,689,899 | 9/1972 | Franaszek | 340/347 DD |
| 3,906,485 | 9/1975 | Hong | 340/347 DD |
| 4,413,251 | 11/1983 | Adler | 340/347 DD |

Primary Examiner—C. D. Miller
Attorney, Agent, or Firm—Roy R. Schlemmer

[57] ABSTRACT

An algorithm and the hardware embodiment for producing a run length limited code useful in magnetic recording channels are described. The system described produces sequences which have a minimum of 1 zero and a maximum of 7 zeros between adjacent 1's. The code is generated by a sequential scheme that maps 2 bits of unconstrained into 3 bits of constrained data. The encoder is a finite state machine whose internal state description requires 3 bits. The encoder requires a lookahead of one future input vector (2 bits) and a look back at the last channel bit generated during the immediately preceding encoding operation. The error propagation due to a random error is, at most, 4 bits in bursts of 5. The hardware implementation is extremely simple and can operate at very high data speeds.

9 Claims, 12 Drawing Figures

FIG.1 (1,7) ENCODER/DECODER SYSTEM

FIG. 2 (1,7) ENCODER BLOCK DIAGRAM

NEXT-STATE NETWORK, (1,7) ENCODER
FIG. 4

FORMAT: | Y'/Z |

$X = (X_2X_1) =$ INPUT VECTOR $Y = (Y_3Y_2Y_1) =$ STATE VECTOR $Y' = (Y_3'Y_2'Y_1') =$ NEXT-STATE VECTOR = $\tau(X,Y)$ $Z = (Z_1Z_2Z_3) =$ OUTPUT VECTOR = $\omega(X,Y)$ ($Z_3 =$ LEAST SIGNIFICANT BIT OF Z)

(1,7) ENCODER STATE MACHINE
FLOW TABLE

FIG. 5

| Y \ X | 0 | 1 | 2 | 3 |
|---|---|---|---|---|
| 0 | 1/1 | 3/1 | 4/0 | 6/0 |
| 1 | 1/1 | 3/1 | 4/2 | 6/2 |
| 2 | 1/1 | 3/1 | 4/0 | 6/0 |
| 3 | 0/2 | 2/0 | 4/0 | 6/0 |
| 4 | 1/2 | 3/5 | 4/2 | 6/2 |
| 5 | 0/5 | 2/0 | 4/0 | 6/0 |
| 6 | 0/2 | 2/4 | 4/4 | 6/4 |
| 7 | 0/0 | 2/0 | 4/0 | 6/0 |

FIG. 6 (1,7) DECODER BLOCK DIAGRAM

FIG. 8 NEXT-STATE NETWORK, (1,7) DECODER

X = (X3 X2 X1)
V = (Y6 Y5 Y4)
Y' = (Y6'.....Y1') = $\tau$(X, V) = (X3 X2 X1 Y6 Y5 Y4)

FIG. 9.1  FORMAT: Y'

| V\X | 0 | 1 | 2 | 3 | 4 | 5 | 6 | 7 |
|---|---|---|---|---|---|---|---|---|
| 0 | 0 | 8 | 16 | 24 | 32 | 40 | 48 | 56 |
| 1 | 1 | 9 | 17 | 25 | 33 | 41 | 49 | 57 |
| 2 | 2 | 10 | 18 | 26 | 34 | 42 | 50 | 58 |
| 3 | 3 | 11 | 19 | 27 | 35 | 43 | 51 | 59 |
| 4 | 4 | 12 | 20 | 28 | 36 | 44 | 52 | 60 |
| 5 | 5 | 13 | 21 | 29 | 37 | 45 | 53 | 61 |
| 6 | 6 | 14 | 22 | 30 | 38 | 46 | 54 | 62 |
| 7 | 7 | 15 | 23 | 31 | 39 | 47 | 55 | 63 |

$X = (X3\ X2\ X1)$   $V = (Y6\ Y5\ Y4)$
$Y' = (X3\ X2\ X1, Y6\ Y5\ Y4) = T(X,V) = X,V$

NEXT-STATE TABLE

| Y1 | Y2 | Y3 | Y4 | Y5 | Y6 | X1 | X2 | X3 | Z1 | Z2 |
|----|----|----|----|----|----|----|----|----|----|----|
| d  | 1  | 0  | 0  | 0  | 0  | d  | d  | d  | 0  | 0  |
| d  | 0  | 0  | 0  | 0  | 0  | d  | d  | d  | 0  | 1  |
| d  | d  | 0  | 1  | 0  | 0  | d  | 0  | d  | 1  | 1  |
| d  | d  | 0  | 0  | 0  | 0  | 0  | 0  | d  | 1  | 0  |
| d  | d  | 0  | 1  | 1  | 1  | 0  | 0  | d  | 1  | 0  |
| d  | 0  | 0  | 0  | 0  | 1  | d  | d  | d  | 0  | 1  |
| d  | d  | 1  | 0  | 0  | 1  | d  | d  | d  | 0  | 0  |
| d  | d  | 1  | 0  | 1  | 1  | d  | 0  | d  | 0  | 0  |
| d  | d  | 1  | 0  | 0  | 0  | 0  | 0  | d  | 0  | 1  |
| d  | d  | 1  | 0  | 0  | 0  | 0  | 0  | d  | 0  | 1  |

$Z = \omega(X, Y)$
$d = $ don't care
$\overline{00} = $ not 00
$Y1, X1, Z1 = $ L.S.B.

OUTPUT TABLE

FIG. 9.2 (1,7) DECODER STATE MACHINE FLOW TABLE

APPARATUS FOR ENCODING UNCONSTRAINED DATA ONTO A (1,7) FORMAT WITH RATE ⅔

BACKGROUND OF THE INVENTION

1. Field of the Invention

The present invention comprises a means for converting unconstrained binary data onto a run length limited format suitable for magnetic recording. The mapping is invertible in such a fashion that errors in detection result in a strictly limited number of errors in the decoded binary data stream.

Various ways have been proposed in the past for increasing the recorded linear density of data on magnetic media. The technique known as run length limited coding represents data on the magnetic medium by the presence or absence of transitions between saturation levels within slots of uniform width. Typically, it is required that there be a minimum (d) and a maximum (k) slots between such transitions, with the absence and presence of transitions represented respectively by a 0 and 1. Hence, the term (d,k) run length limited.

In many disk recording systems a good value for the parameter d is one. It is then desirable to minimize the value k while maximizing the transmission rate (number of bits per channel symbol. Another parameter of practical importance is the degree of error propagation limitation. This is measured by the maximum number of errors in the decoded error bits as the result of a single error in detection.

2. Description of the Prior Art

U.S. Pat. No. 3,689,899 to P. A. Franaszek discloses two possible (d,k) codes: a (1,8) and a (2,7). These data codes are variable length fixed rate codes. The coding rate of the (1,8) code is ⅔ and its code dictionary consists of 16 code words whose length vary from 3 to 9 bits, in multiples of 3. The (2,7) code has a rate of ½ and its dictionary consists of 7 words with length varying from 2 to 8 bits, in multiples of 2.

An article by T. Horiguchi and K. Morita, "An Optimization of Modulation Codes in Digital Recording", IEEE Transactions on Magnetics, Vol. MEG-12, No. 6, November 1976, p. 740, describes a variable length, fixed rate (1,7) rate ⅔ code. The coding technique described in this article, differs from that of the above invention in the method of decoding. Their (1,7) rate ⅔ code has an error propagation of 6 bits in a burst of 6.

An article entitled "Efficient Code for Digital Magnetic Recording" by P. A. Franaszek, in the IBM Technical Disclosure Bulletin, Vol. 23, No. 9, February 1981, page 4375, describes the principles used herein for the (1,7) rate ⅔ code. The apparatus disclosed herein differs from that of this article in that code word assignments have been permitted to simplify the encoding circuits and optimize error propagation limitation. Unlike the above work, the current encoder does not employ words of variable length.

Copending U.S. patent application, Ser. No. 283,758 filed July 16, 1981, entitled, "Method and Apparatus for Generating a Noiseless Sliding Block Code" for a (1,7) Channel with a Rate ⅔ of R. Adler, et al, as the title implies, discloses a sliding block code having the same (d,k) and rate i.e, ⅔, parameters as the present code. However, the coding method of this patent is a sequential scheme and employs look ahead at the decoder. The present scheme utilizes a bounded delay code which employs look ahead at the encoder as will be more fully described subsequently.

SUMMARY OF THE INVENTION

It is accordingly a primary object of the present invention to provide an improved method and apparatus for producing a (d,k) (1,7) run-length limited code.

It is a further object of the invention to provide such a code having a coding rate ⅔ where 2 unconstrained data bits are mapped into three constrained channel bits.

It is another object of the invention to provide such a code wherein error propagation at the decoder does not exceed 4 data bits in a burst of five.

It is another object of the invention to provide a highly efficient encoder/decoder design for producing such a constrained (1,7) run-length limited code.

The objects of the present invention are met by the presently described code and hardware logic design specified by the herein disclosed Boolean logic tables which explicitly define hardware for mapping unconstrained data into the desired constrained format in an invertible manner.

The presently disclosed method and apparatus codes an unconstrained binary data stream onto a (d,k)=(1,7) constrained sequence with a rate of ⅔ where error propagation is limited to four in a burst of five. That is, a single error in detection produces at most, 4 decoding errors which lie within a group of 5 bits. This is a significant improvement of the code developed by T. Horiguchi and K. Morita, in the article described above.

For the RLL code parameters d=1, k=7, a finite state machine encoder is specified whose internal state description requires 3 bits denoted by Y=(y2, y1, y0). This encoder is described by two Boolean functions: the next state transition function which maps the input X=(x1, x0) and the present state Y=(y2, y1, y0) into the next state Y'=(y'2, y'1, y'0) and the output function which maps the input X=(x1,x0) and the present state Y=(y2, y1, y0) into the output Z=(z2, z1,z0). It should be noted at this point that the state vector is composed of three bits, two of which comprise the two bits of the immediately preceding input vector. Thus, it is the vector which is actually encoded as a function of the next input vector which is itself encoded during the next coding operation.

The decoder requires a look back of two channel symbols which consists of 6 bits. These are denoted by Y=(y6,y5,y4,y3,y2,y1). The decoder is specified by Boolean equations that define the output vector Z as a function (ω) of the channel vector X and the state vector Y. The next-state vector Y' is defined as a function (τ) of the channel vector X and a vector V which is a portion of the current state vector Y.

BRIEF DESCRIPTION OF THE DRAWINGS

FIG. 3 is an organizational drawing for FIGS. 2.1 and 3.2.

FIGS. 3.1 and 3.2 comprise a logical schematic diagram of the output logic network block of FIG. 2.

FIG. 9.1 comprises a next-state transition table for next-state network of FIG. 8.

FIG. 9.2 comprises an output table for the output logic block of FIG. 7.

DESCRIPTION OF THE PREFERRED EMBODIMENT

Before presenting a detailed description of a preferred hardware embodiment for realizing the (1,7) run length limited code of the present invention there will follow a general description of the mathematical basis of the invention.

The coding apparatus described herein differs from the variable length techniques described above in that all words are of the same length. Instead, a look ahead technique is employed which ensures that data or source words to be encoded at a particular time match the available code words. The look ahead mechanism may be regarded as a means for steering the encoder so that available code words match the data stream. A more precise description is given below.

Mathematical Basis for the Invention

The (1,7) constrained sequence may be regarded as the output of the finite state machine given below.

As an example, consider the state sequence $S_0S_1S_0S_1$. This corresponds to channel symbols 010. All available sequences may be obtained by tracing paths between the above states.

The encoder partitions the incoming data in data words of two bits. Each of these is then mapped onto a code word which is a sequence of three channel symbols, for a rate of ⅔. It may be noted that the available code word is a function of the state occupied by the coder. Each state may, in general, have insufficient code words available (4) necessary to encode any two bits. The technique described here overcomes this problem in the following manner. Look-ahead is employed to determine which data word is to be encoded next. Then the choice of code word used for the current data word is such as to drive the constrained sequence into a state where the next data word has an appropriate mapping. The coder operates as described in the following state dependent table.

| Encoder State Dependent Table | | | | | | |
|---|---|---|---|---|---|---|
| Current Data Word | | Next Data Word | | Channel Symbol (Z) to be produced | | |
| x1 | x2 | x3 | x4 | z1 | z2 | z3 |
| If last bit (z3) | 1 | 0 | 0 | x | 1 | 0 | 1 |
| | 1 | 0 | 1 | x | 0 | 1 | 0 |

| Encoder State Dependent Table | | | | | | |
|---|---|---|---|---|---|---|
| Current Data Word | | Next Data Word | | Channel Symbol (Z) to be produced | | |
| x1 | x2 | x3 | x4 | z1 | z2 | z3 |
| of | 1 | 1 | 0 | 0 | 0 | 1 | 0 |
| previous | 1 | 1 | 0 | 0 | 1 | 0 | 0 |
| channel | 0 | 0 | 0 | x | 0 | 0 | 1 |
| word was | 0 | 0 | 1 | x | 0 | 0 | 0 |
| a 0. (eg | 0 | 1 | 0 | x | 0 | 0 | 1 |
| 100) | 0 | 1 | 1 | x | 0 | 0 | 0 |
| If last | 0 | 0 | 0 | x | 0 | 0 | 1 |
| bit (z3) | 0 | 0 | 1 | x | 0 | 1 | 0 |
| was a 1 | 0 | 1 | 0 | 0 | 0 | 1 | 0 |
| (eg 101) | 0 | 1 | 0 | 0 | 0 | 0 | 0 |

00 means not 00
X is don't care

As an example, consider the first line of the above table. If the last channel symbol produced by the encoder is a 0, (as indicated by the legend in the left hand column), the current data word is a 10 (eg bits x1, x2) and the next data word (bits x3, x4) starts with a 0, then the channel word (z1, z2, z3) 101 is produced by the coder. This code word drives the channel into the state represented by the last four lines of the table, where code words are available only for data words which start with 0. If the last channel symbol is a 0, the current data word is a 10 and the next data word starts with a 1, then the code word produced is 010. Note that in either case the coder is driven to a corresponding channel state which permits the encoding of the next word.

It is important to understand that the encoder must be initialized with a state vector Y which will allow the system to follow the d,k coding rules at startup. This initial state vector is y3=0, y2=1, y1=0, wherein bit y3 is, in effect, bit z3, the last or least significant bit of the preceding channel symbol. By assuming that this bit is a 0, the coding rules of the present method will assure that no more than six 0's can follow. If it were assumed that z3 was a 1, possibly seven 0's could follow.

The dummy bits y2 and y1 of the initializing state vector Y will, in effect, be coded on the first cycle of operation, the first real information vector X will be encoded on the second cycle. Thus, although the initialization data carries no information content, it is important that the protocol be followed for proper operation of the system.

Similarly, at the end of the data message, two dummy bits must be padded onto the message stream so that the last two data or information bits can be encoded. As will be well understood at this point, the two dummy bits permit the requisite look-ahead at the input vector X necessary to encode the last two actual message bits which have become bits y2 and y1 of the state vector. Any padding configuration can be used, the only requirement is that it be a known system protocol.

Obviously, other informational messages could be tacked to the end of any information message for control purposes such as "end of record", "end of message", "turn off encoder", etc., in addition to the above dummy bits as will be well understood by those skilled in the art.

The following decoder state table was developed utilizing the preceding encoding table and performs the mathematical inverse of the encoding operation. The output vector Z is produced as a function of a total of three incoming constrained channel vectors X. These are shown as $X_0$ the channel vector currently being decoded, $X_{-1}$ the preceding channel vector, and $X_1$, the next channel vector. It will be noted that during a current decoding operation the vectors $X_0$ and $X_1$ form the state vector Y and the current input vector $X_1$ is the current input vector designated as X on FIGS. 6, 7 and 8. The decoder state machine flow table of FIG. 9.2 was directly implemented from this table.

Figure 92:
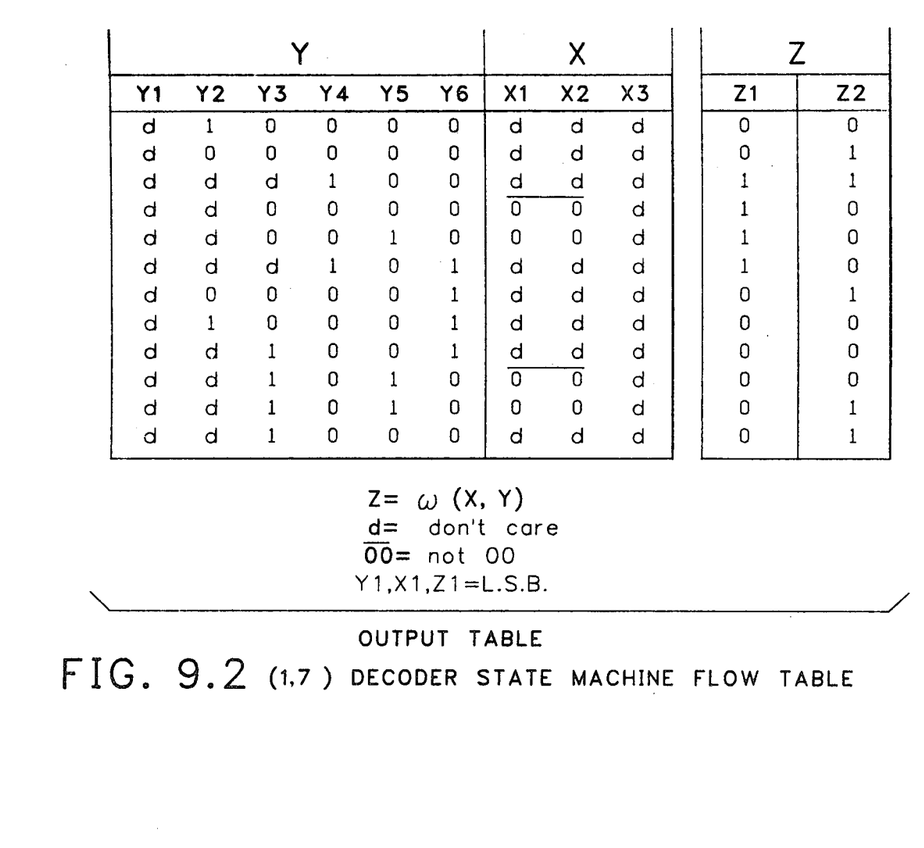

| Decoder State Dependent Table | | | |
|---|---|---|---|
| $Y_{-1}$ | $X_0$ | $X_1$ | Z |
| X10 | 000 | XXX | $\overline{00}$ |
| X00 | 000 | XXX | 01 |
| XXX | 100 | XXX | 11 |
| XX0 | 010 | 00X | 10 |
| XX0 | 010 | 00X | 11 |
| XXX | 101 | XXX | 10 |
| X00 | 001 | XXX | 01 |
| X10 | 001 | XXX | 00 |
| XX1 | 010 | XXX | 00 |
| XX1 | 010 | 00X | 00 |
| XX1 | 010 | 00X | 01 |
| XX1 | 000 | XXX | 01 |

$\overline{00}$ means not 00
X is don't care

A single error in detection causes at most 5 bits of the decoded unconstrained data stream Z to be affected.

Having described the underlying concepts of the herein disclosed run length limited coding system, there will now follow a detailed description of the preferred embodiment of a hardware realization of same.

The bounded delay codes described herein, employ look-ahead at the encoder as contrasted with the sliding block codes of copending Adler, et al application which employs look-ahead at the decoder. This will be apparent from the subsequent description of the system.

Figure 1:
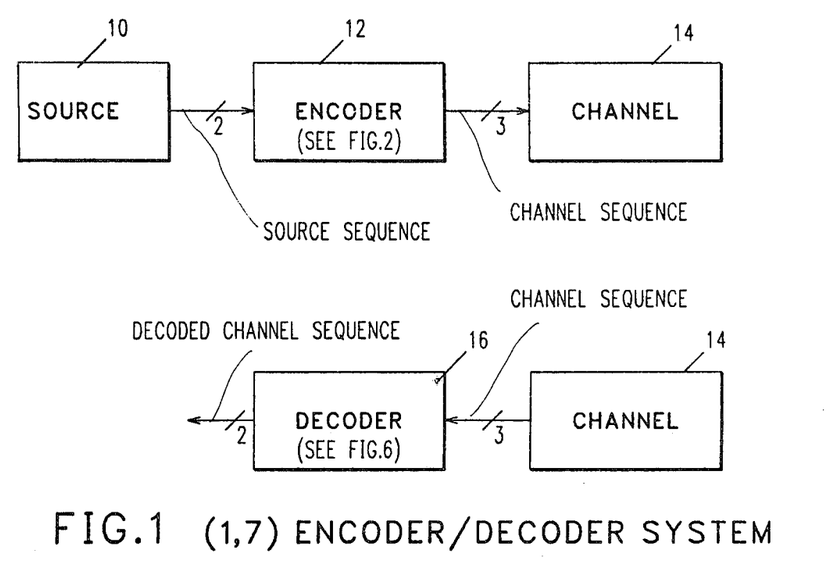
FIG. 1 comprises a functional block diagram of an encoding/decoding system in which the present coding method and apparatus would have utility.

Referring now to FIG. 1, there is shown a high level functional block diagram of a typical encoding/decoding system which would describe any such system that required the conversion of data to a constrained format regardless of the specific coding run length limitations, i.e., value of d,K. Source block 10 represents a source of binary data which is unconstrained and which is applied two bits at a time to the encoder 12. The output of the encoder 12 is a sequence generated by catenations of the three bit words produced thereby. The coded sequence is matched or constrained to the characteristics of the channel as explained previously. Also, as described previously, it is assumed that the channel for which the present RLL code is specifically adapted would be a magnetic recording medium, such as a magnetic disk, tape, or the like. However, as will be appreciated by those skilled in the art, the channel could also be a transmission medium, etc.

In this latter regard, it is to be noted that the code restraints might not be ideally suited to a particular channel but might be used because of the availability of the coding hardware within the system and also due to the fact that the constrained code so produced was still better than a generally unconstrained code.

When it is desired to decode the constrained data from the channel back into its original or unconstrained format, the encoded data is supplied three bits at a time to the decoder, which, as will be well understood, performs the reverse function of the encoder to produce the desired sequence of two bit unconstrained data groups or segments corresponding to the original data.

Figure 2:
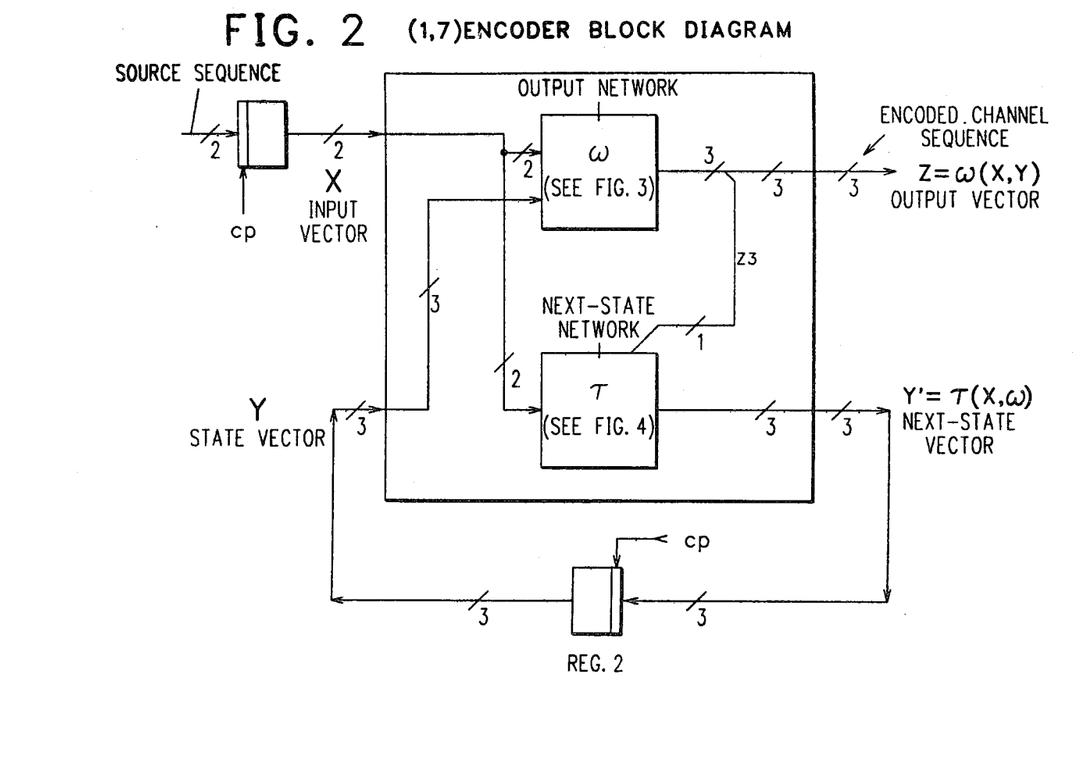
FIG. 2 is a functional block diagram of a finite state (1,7) encoder suitable for use in the present invention.

Referring to FIG. 2, there is illustrated a functional block diagram of the encoder of the present invention. The encoder includes two registers, 1 and 2. Register 1 stores consecutive two-bit groups of input data which is received from an unconstrained source and this register, when appropriately gated, supplies consecutive two-bit groups which form the input vector X. Register 2, as is apparent from the drawing, stores three bit groups which comprise the next-state vector Y'. When an appropriate clock pulse is supplied to these two registers, a new input vector X and state vector Y is supplied to the encoder. It will be noted that the next-state vector Y' becomes the state vector Y during the preceeding operation.

The actual encoding operation is performed in the output network $\omega$ and by the next-state network $\tau$. The logic circuitry contained in these two blocks is shown in detail in FIGS. 3.1 and 3.2 and FIG. 4, respectively. The output network $\omega$ produces the actual output vector, or channel symbol, Z which comprises the three bits z1, z2, z3, indicated in the drawing. The next-state network $\tau$ produces the three bits of the next-state vector Y'. The numbers of bits making up each of the vectors X, Z, Y' and Y are clearly shown in the data flow lines of FIG. 2. A particular designation of the specific bits supplied to each logic block is similarly, clearly shown in FIGS. 3.1, 3.2, and 4 for the encoder and similarly, is clearly shown in the respective figures for the decoder. For convenience of reference, the specific bits making up the various vectors are shown in the following table of definitions. It should be noted that in this table, as well as in the drawings, the large or capital letter stands for a multi-bit vector whereas the small letters refer to particular bits within a particular vector.

| VECTOR DEFINITION TABLE |
|---|
| X = Input Vector, (x2,x1), x2 = MSB |
| Y = State Vector, (y3,y2,y1), y3 = MSB |
| Y' = Next-State Vector, (y3',y2',y1'), y3' = MSB |
| Z = Output Vector, (z1,z2,z3) z1 = MSB |

As stated previously, the state vector Y has as its principal component, bits x1 and x2 of the input vector $X_0$ processed during the previous coding cycle and it is this input to the output logic network $\omega$ of the encoder which is being encoded as a function of the new input vector $X_1$.

Thus, in summation, the overall data flow within the encoder, is clearly shown in FIG. 2, wherein the unconstrained input vector X and the state vector Y are supplied to the logic circuitry of the output network and the next-state network and they, in turn, produce the constrained output vector Z and the next state vector Y'.

Figures 3, 32:
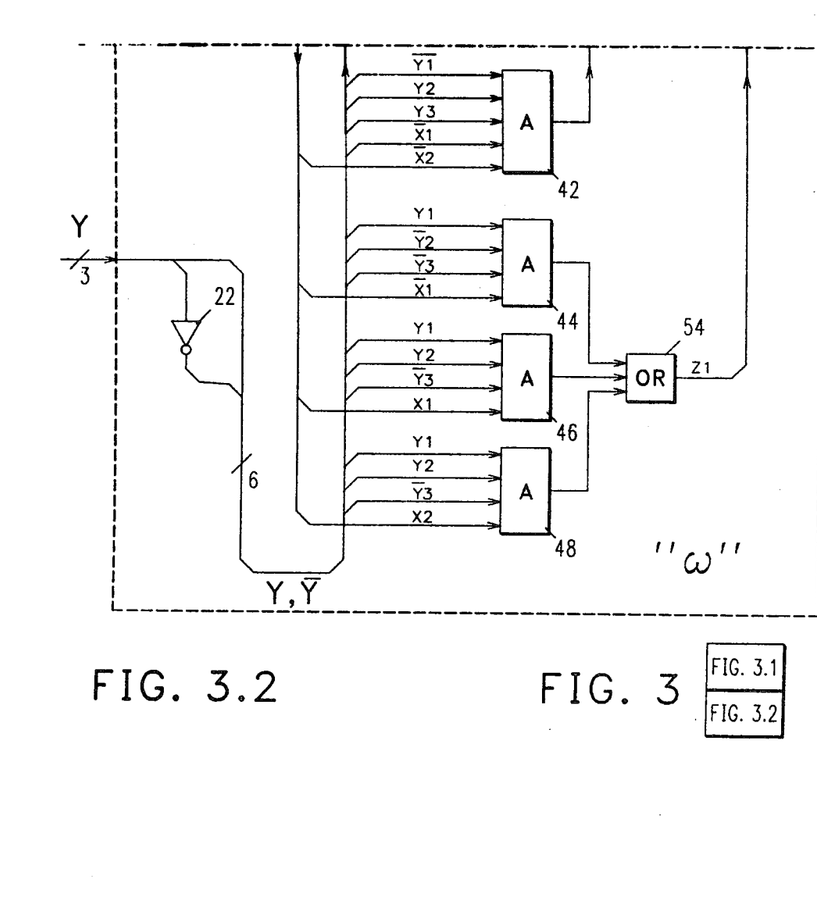
Figure 31:
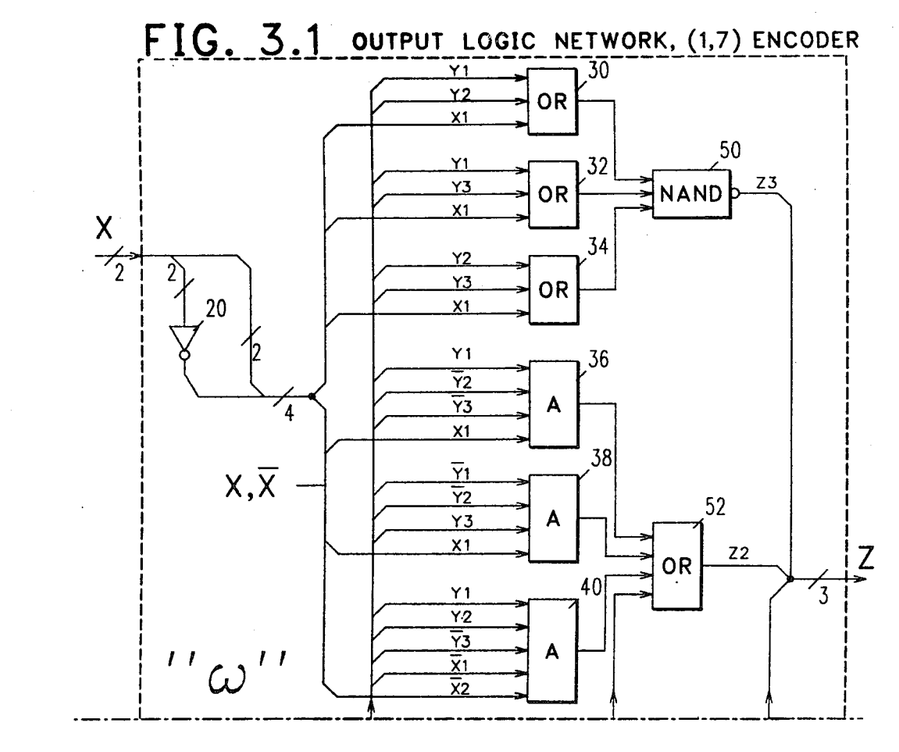

The data flow in the output logic network for the present encoder is clearly shown in the composite diagram of FIGS. 3.1 and 3.2. In this FIG. the two inputs to the network comprising the two bit input vector X, the look-ahead vector, and the three bit next-state vector Y are clearly labeled as well as the three-bit output vector Z. Further, all of the individual inputs to the three OR circuits and six AND circuits, making up the first logic level, are similarly clearly labeled. The operations and functions of all of the indicated logic circuits is believed to be obvious and need not be further recited. It should be noted that the entire output logic network comprises essentially three logic levels. The first comprises the two inverters 20 and 22 which provide the inverted vectors $\overline{X}$ and $\overline{Y}$. As will be appreciated, the use of these inverters simplifies subsequent logic circuitry by providing the inverted functions of the various bits of each vector. The second logic level comprises the three OR circuits; 30, 32 and 34 and the six AND circuits, 36 through 48. The output of these logic circuits feeds, as clearly indicated, into the third logic level comprising NAND 50 and OR circuits 52 and 54. The output of these latter three logic circuits comprises the three bits z1, z2, and z3 of the three bit output or channel vector, Z, wherein it should be noted that z3 is the least significant bit.

Figure 4:
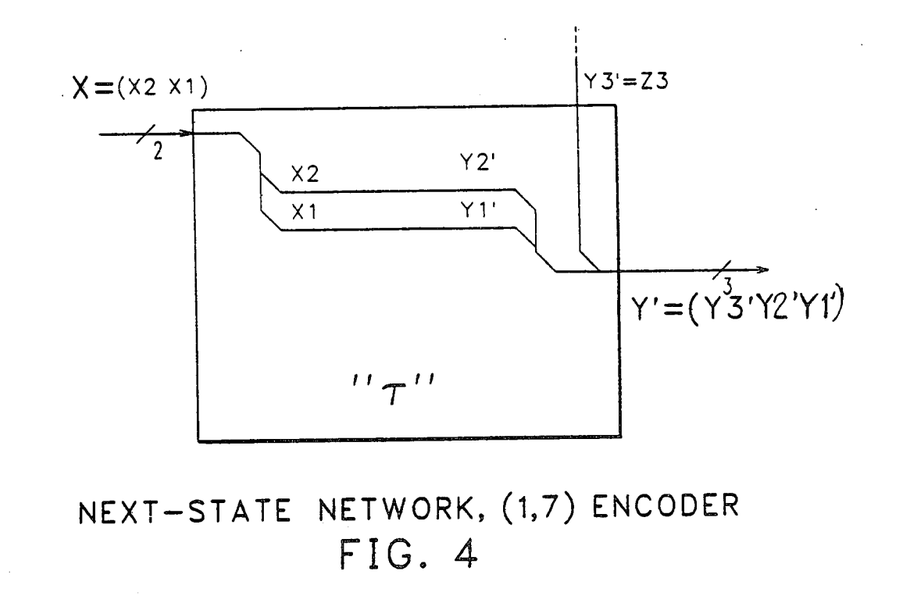
FIG. 4 comprises a logical schematic diagram of the next-state network block of FIG. 2.

It will be noted in referring to the subsequent description of FIG. 4, that the circuitry of FIGS. 3.1 and 3.2, comprising the output logic network comprises, in effect, the entire active logic circuitry required of the encoder in addition to registers 1 and 2. The next-state network of FIG. 4 is essentially a catenation circuit and actually performs no logic. It will be apparent, of course, that the hardware circuitry of the output logic network is specifically designed for to provide a run-length limited (1,7) rate ⅔ run length limited code as specifically set forth and described in the present invention and whose coding rules are specifically set forth and delineated by the encoder state machine flow table of FIG. 5. Thus, the complete encoder and decoder could be readily designed and placed on a single VLSI chip.

The next-state network for the present (1,7) encoder is as shown in FIG. 4. This is actually the $\tau$ block shown in FIG. 2 and as will be apparent, this block performs a simple catenation wherein it combines the current input vector X with bit $z_3$ of the current output vector, to produce the next state vector Y'. Correspondence of the various bits of the next state vector is clearly indicated on the drawing. However, it is repeated in the following table for convenience of reference:

| NEXT STATE VECTOR TABLE |
| --- |
| y'1 = X1 |
| y'2 = X2 |
| y'3 = Z3 |

Thus, it is clearly apparent that the next-state network for the present encoder performs no logic, its output being the next-state vector Y' which is stored in the register 2 shown on FIG. 2 whence it is gated back in through the output logic network during the next encoding cycle.

As will be apparent, it is the next-state circuit which actually provides for the look-ahead function of the encoder, by supplying the bits of an input vector $X_0$ during a subsequent coding operation when input vector $X_{-1}$ is actually being gated into the system.

Figure 5:
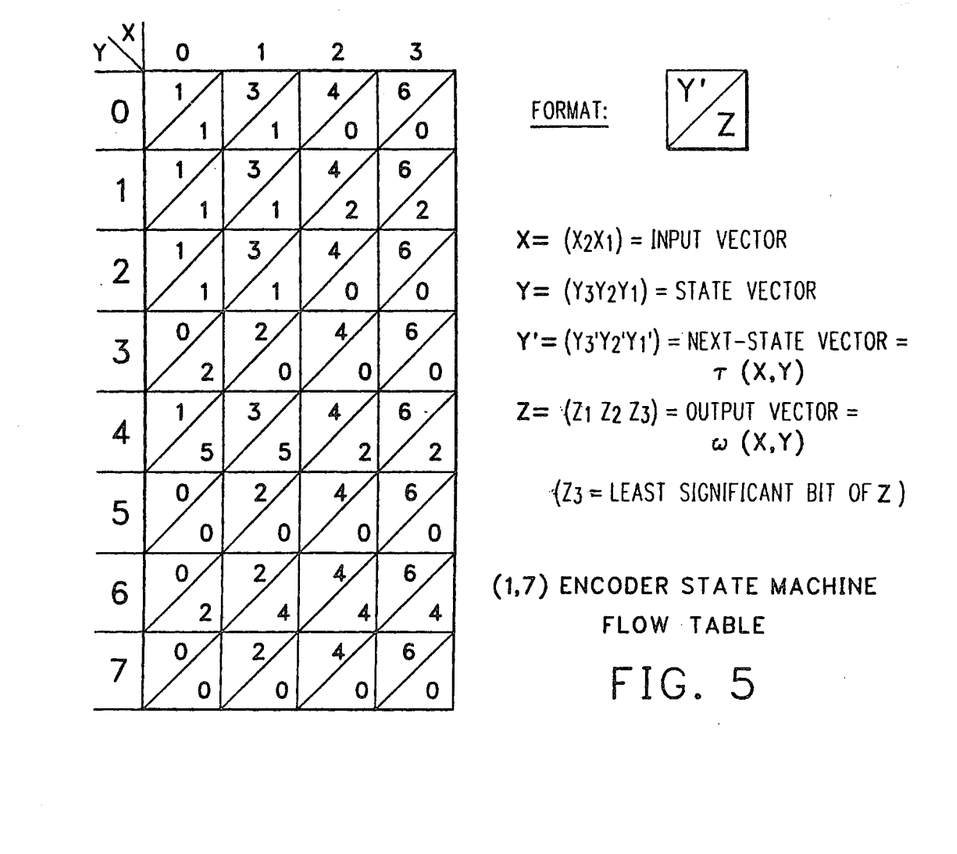
FIG. 5 comprises a state machine flow table for the encoder as shown in FIG. 2, which table defines the detailed outputs required for all possible data input and state input conditions.

Referring now to FIG. 5 the (1,7) encoder state machine flow table clearly defines the precise coding configurations and vector definitions which clearly and explicitly define the logic configuration of the output logic network and the next state network which perform the actual encoding operations. Referring to the FIG. the top and leftmost edge specify the two input coding arguments which are, obviously, the input vector X and the next state vector Y. The contents of the table specify the particular output vector Z and the next-state Y' which must be produced with a given input argument if the present coding rules are to hold.

It should be noted that the table in FIG. 5 is decimal rather than binary in content, for the sake of simplicity. However, in applying said table to the logic circuitry, all of the decimal numbers shown would, of necessity, have to be converted into the various two and three bit binary vectors which would represent the decimal values shown. Thus, for example, assume an input vector X=2 and a next state vector Y=5, this would produce a next state vector Y'=4 and output vector Z=0. These would convert to the binary values 10, 101, 100, and 000 respectively.

To construct the logic circuitry from the explicit logic functions set forth in the table, is believed to be clearly within the knowledge of a person skilled in a binary logic circuit design. It is further to be noted that the specific logic design shown in FIGS. 3.1 and 3.2, as well as the catenation circuitry of FIG. 4, presents a preferred logic configuration capable of performing the logic functions specified in FIG. 5. As one final point in referring to FIG. 5, it should be noted that the gating of the individual bits of the output vector Z is reversed from that of the other three vectors in that $z_3$ is the least significant bit of Z and similarly, $z_1$ would be the most significant bit.

This completes the description of the operation of the (1,7) coder of the present invention. The operation and organization of the decoder is quite similar, in that it performs essentially the mathematical or coding inverse of the encoding function.

Figure 6:
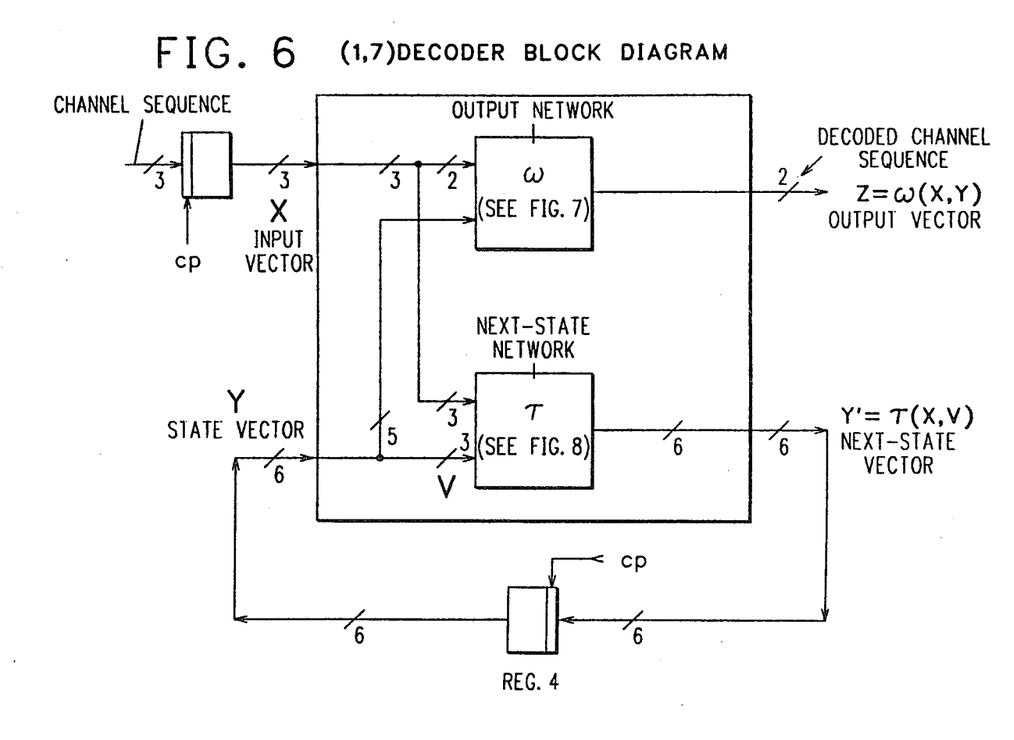
FIG. 6 is a functional block diagram similar to FIG. 2 of a finite state (1,7) decoder suitable for use in the present system.

Referring to FIG. 6 which is a functional block and data flow diagram of the (1,7) decoder of the present invention, it will be noted that the overall organization and data flow of the decoder is very similar to that of the encoder as shown in FIG. 2. Thus, the decoder comprises two registers, Reg. 3 and Reg. 4, and two functional logical combinatorial networks, the output network $\omega$ and the next-state network $\tau$ shown in detail in FIGS. 7 and 8, respectively. The four multi-bit vectors are clearly indicated in the FIG. as the three bit input vector X, the six bit state vector Y, the two bit output vector Z, and the six bit next-state vector Y'. The data flow and the number of bits contained on the various interconnection cables of the decoder are also shown clearly in FIG. 6.

Figure 91:
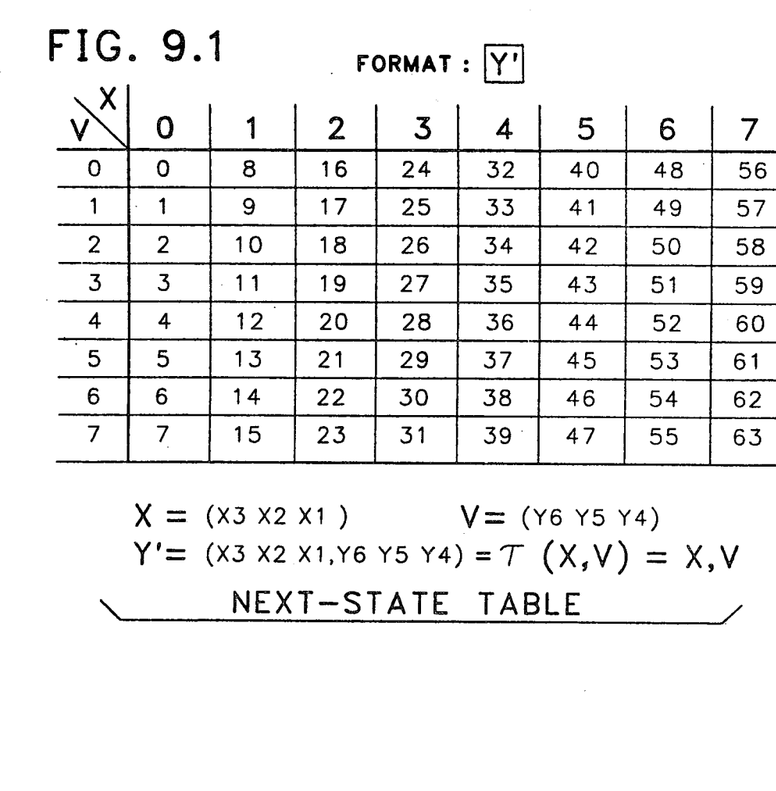

It should be clearly understood that the vector designation for the decoder, i.e., X, Y, Z, and Y' does not refer to the same vectors as the similarly labeled vectors for the encoder. Thus, in the case of the decoder the input vector X is actually the three bit channel vector which was the output vector Z of the encoder. Similarly, the output vector Z, as shown in the decoder, is a two-bit vector, i.e., unconstrained, and would correspond to the unconstrained two-bit input vector X, entering the encoder. The functional relationships between the vectors and the functional block diagrams is clearly shown in FIG. 6 wherein the formula for the output vector states that it is a function $\omega$ of the three-bit input vector X and the six-bit state vector Y. Similarly, the next-state vector Y' is a function $\tau$ of the two vectors X and V. The V vector is defined both on FIGS. 8 and 9.1.

Figure 7:
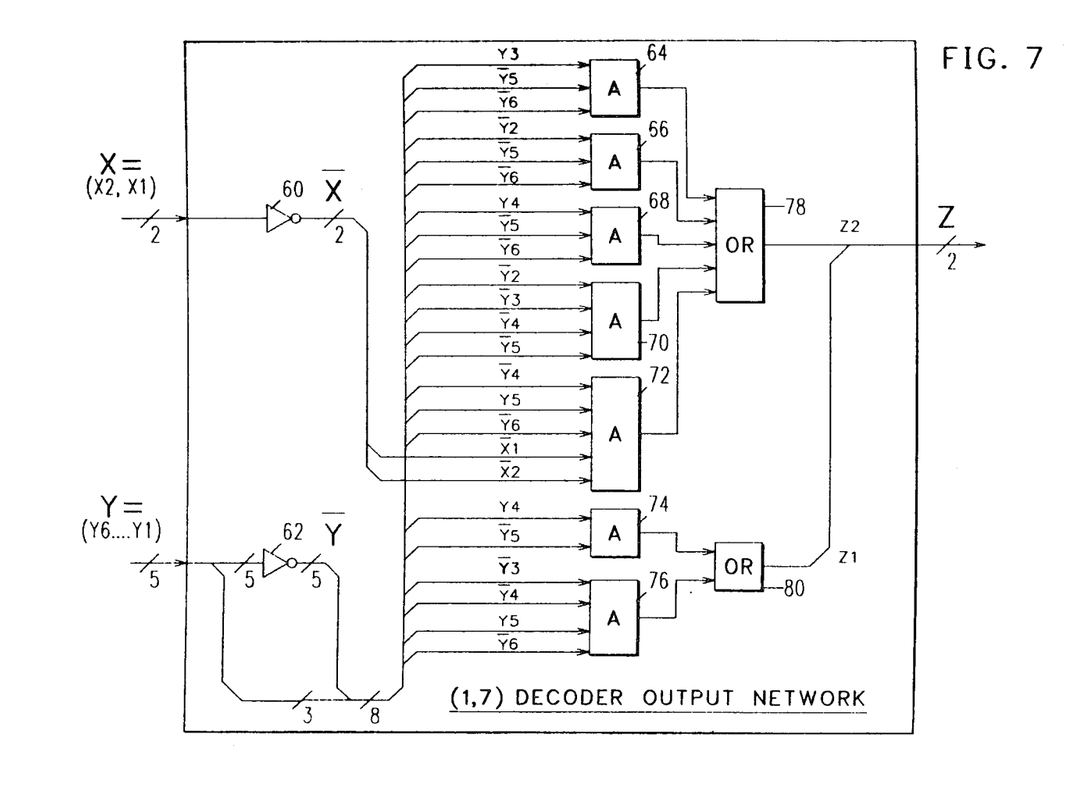
FIG. 7 is a logical systematic diagram of the (1,7) decoder output network block shown in FIG. 6 similar to FIGS. 3.1 and 3.2 of the encoder hardware.

The function ω for the output network is defined and is specified by the logic schematic diagram of FIG. 7. Similarly, the function τ is defined by the next-state network shown in FIG. 8 which is very similar to the next-state network for the encoder shown in FIG. 4 in that it essentially performs a catenation, or bit reordering, function.

While all of the vectors and definitions are clearly labeled on the particular FIGS. as required, the following table is presented for convenience of reference.

---

TABLE OF DEFINITIONS OF THE DECODER VECTORS $X = (x3, x2, x1) =$ input vector
$Z = (z1, z2) =$ output vector
$Y = (y6, y5, y4, y3, y2, y1) =$ state vector
$V = (y6, y5, y4)$
$Y' = (y6', y5', y4', y3', y2', y1') =$
$(x3, x2, x1, y6, y5, y4) =$ next state vector

---

Referring now briefly, to FIG. 7, it will be noted that the logic circuitry of FIG. 7 is similar to the logic circuitry of the encoder as shown in FIGS. 3.1 and 3.2. Similarly, the decoder logic circuitry requires essentially, three logic levels wherein inverters 60 and 62 comprise the first level, the seven AND circuits 64 through 76 comprise the second logic level and the OR circuits 78 and 80 comprise the third logic level. The two input vectors to the decoder output network X and Y are clearly labeled as well as the output vector Z. All of the individual bit lines fed into the second logic level are clearly defined, it being noted that the not functions for the respective bits are produced by the two inverters 60 and 62, as will be well understood.

Finally, the third logic level of the decoder output network comprises the two OR circuits, 78 and 80, which produce the two bits z2 and z1, respectively, of the output vector Z. As is the case, with the encoder network, the decoder could easily be implemented on a single chip in VLSI technology or could even be combined with the encoder on a single chip.

Figure 8:
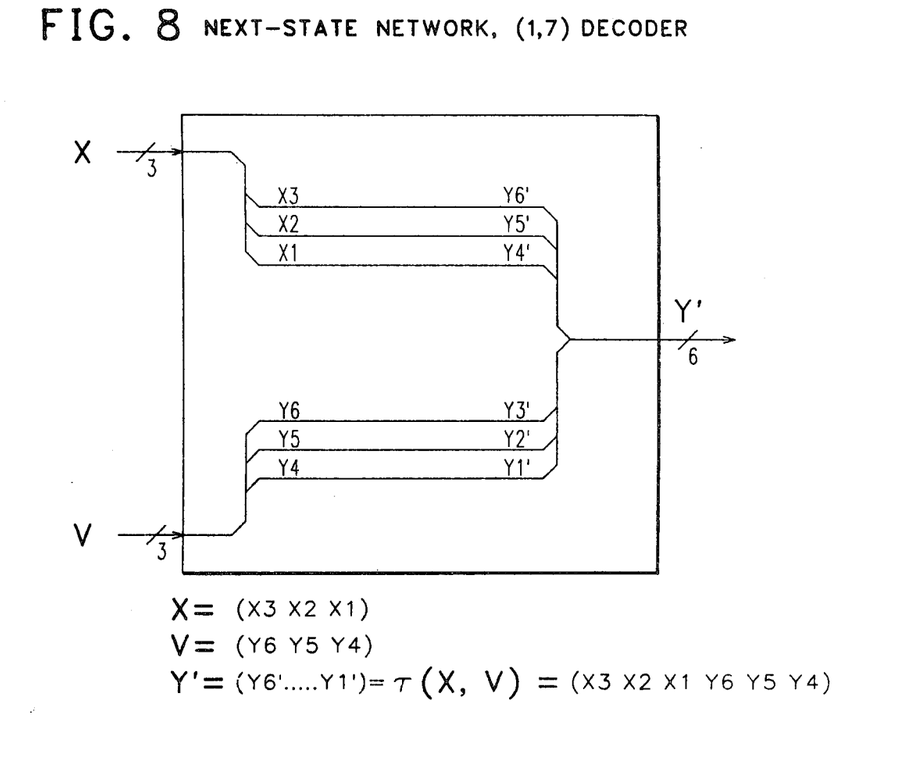
FIG. 8 is a logical schematic diagram of the present (1,7) decoder next-state network block shown in FIG. 6.

Referring now to FIG. 8, the next-state network for the present decoder comprises a catenation circuit wherein the X vector and the V vector are combined in a predetermined fashion to form the next-state vector Y'. It should be noted in passing that the next-state vector Y', at any given instant, is made up of the current input vector X and the just preceeding input vector which is denoted herein as V. Thus, at any given time, as a current input vector X is being decoded, the two immediately preceeding input vectors which, in effect, form the state vector Y, are utilized in the decoding function.

The actual bit by bit logic operation performed by the next-state network τ of FIG. 8 is set forth in FIG. 9.1 in the same format as utilized in the encoder state machine flow table of FIG. 5. That is to say, the table is decimal in content. However, it is to be understood that the logical designer must convert the decimal numbers to binary numbers. The two arguments, or inputs, comprising the two vectors X and V are shown at the top and left of the table respectively. Similarly, proper value for the next-state vector Y', is in the body of the table. For example, if the X vector were 7 and the V vector were 7, then the proper value for the vector Y' would be 63. These three vectors, represented in binary form would be 111, 111, and 111111.

Referring now to FIG. 9.2, the decoder output table is shown. This table is in binary format in view of the relatively small number of entries necessary. This small number is due to the fact that in many instances, one or more of the argument bits of either the Y or X vectors have no effect on the output vector Z. These situations are denoted in the table by the symbol d (don't care) which means that any bit position so marked has no effect on the value of the output vector, assuming the specified bits of the input argument are as shown in the table.

Referring to FIG. 9.2 the two bit columns y1 and x3 contain nothing but 'don't care' symbols.

Accordingly, either of these bits need to be taken into consideration during the decoding operation, thus referring to FIG. 7, it will be seen that bits x3 and y1 do not enter the decoding computation and hence are not included as inputs to any of the logic circuitry of the network.

Referring to the x1 and x2 columns, the two symbols $\overline{00}$ denotes the logical function "not 00". This symbol thus includes all values for the bits x1, x2, $=01$, 10, and 11. (i.e., not 00)

The overall decoder state machine flow table labelled on FIG. 9.2 is composed of both the next-state table shown on FIG. 9.1 and the output table shown on FIG. 9.2. The output table specifies explicitly the functions required of the logic design of the decoder output network of FIG. 7 as described previously with respect to FIGS. 3.1 and 3.2. The disclosed network logic configuration of FIG. 7 is believed to represent a preferred embodiment of the logic design of a decoder output network, capable of producing the specified output code vectors Z from the specified input vectors Y and X.

It is of course, obvious, that certain changes could be made in both the encoder output network and also the decoder output network by skilled logic circuit designers which would still produce the same output vectors. It is to be noted, however, that the specific output tables, do in fact, specify an extremely limited class of logic configurations which would, in fact, produce the required output codes for both encoding and decoding.

This completes the description of the herein disclosed (1,7) rate ⅔ run-length limited coding system.

Industrial Applicability

The encoder/decoder method and apparatus of the present invention has particular utility in dynamic recording systems, such as magnetic recording channels wherein the particular (1,7) run length limited code described, provides superior recording results in the magnetic medium as is well known in the art.

As is apparent from the preceding description, the hardware is extremely efficient in that an absolute minimum of circuitry is required and, as will be appreciated from the logical schematic diagrams, a minimum number of logic levels are required in the logic circuitry, thus enabling it to operate very rapidly.

When contrasted with existing coding methods which generally require table look-up operations for both encoding and decoding, the technical advantages of the present invention are obvious.

The economic advantages to such a system when compared with run length limited encoder/decoder hardware utilized in the prior art are also obvious. The 4 bit error propagation inherent in the present code is smaller than in previously existing codes, thus rendering the coding method more reliable and thus more valuable.

Having thus described my invention, what I claim as new, and desire to secure by Letters Patent is:

1. A method for encoding by lookahead a series of unconstrained binary input symbols into a run length limited (1,7) code having a ⅔ rate which comprises consecutively entering one new input symbol (X) comprising 2 bits into a logical tree coding network and simultaneously entering three state bits (Y) which were produced by the encoder during the immediately preceding encoding operation into the same encoding network and producing three channel outputs bits (Z) obeying said (1,7) encoding rules and three next state bits (Y') for use in the next succeeding coding operation, wherein the encoding of a given input symbol $X_0$ is performed as a function of the next input symbol $X_{-1}$.

2. A method for encoding as set forth in claim 1, including mapping two of the state vector (Y) bits into said three channel bits (Z) as a function of the two current input bits (X) and 1 bit z3, the least significant bit of the preceding channel symbol (Z).

3. A method for encoding as set forth in claim 2 wherein the mapping of the state vector (Y) and the input vector (X) into the output vector (Z) and the next state vector (Y') is performed according to the following mapping table.

| X<br>Y | 0 | 1 | 2 | 3 |
|---|---|---|---|---|
| 0 | 1/1 | 3/1 | 4/0 | 6/0 |
| 1 | 1/1 | 3/1 | 4/2 | 6/2 |
| 2 | 1/1 | 3/1 | 4/0 | 6/0 |
| 3 | 0/2 | 2/0 | 4/0 | 6/0 |

| X<br>Y | 0 | 1 | 2 | 3 |
|---|---|---|---|---|
| 4 | 1/5 | 3/5 | 4/2 | 6/2 |
| 5 | 0/0 | 2/0 | 4/0 | 6/0 |
| 6 | 0/2 | 2/4 | 4/4 | 6/4 |
| 7 | 0/0 | 2/0 | 4/0 | 6/0 |

FORMAT: Y'/Z

X = ($X_2X_1$) = INPUT VECTOR
Y = ($Y_3Y_2Y_1$) = STATE VECTOR
Y' = ($Y_3'Y_2'Y_1'$) = NEXT-STATE VECTOR = $\tau$ (X,Y)
Z = ($Z_1Z_2Z_3$) = OUTPUT VECTOR = $\omega$ (X,Y)

wherein the decimal values in said table are representative of the binary values manipulated by said method and wherein in the multibit binary vectors X, Y, Y' and Z, bits x2, y3, y3', and z1 are the most significant bits.

4. A method for encoding as set forth in claim 3 including inserting a predetermined data input configuration into the input code stream to cause the state bits (Y) to assume a predetermined pattern whereby a predetermined channel symbol (Z) configuration is produced which is adapted for control use and for initializing the system.

5. A lookahead encoder for producing a run length limited (RLL) code for use in a structurally constrained environment, said code having a minimum of 1 and a maximum of seven 0's between adjacent 1's and a coding rate ⅔, said encoder comprising means for receiving as an input vector (X) for a given encoding operation, two new message bits and a three bit state vector (Y) derived from the immediately preceding encoding operation, logic circuit means for producing a three bit constrained channel vector (Z), obeying said RLL coding rules and a three bit next-state vector (Y') which becomes the state vector (Y) for use in the next encoding operation, said logic circuit means producing the channel vector Z as a direct function of the two current input bits and the immediately preceding two input bits to said logic circuit means and forming the next-state vector as a catenation of the two current input bits and the least significant bit (z3) of the current channel vector (Z).

6. An encoder as set forth in claim 5 wherein said logic circuit means comprises a maximum of three functional logic levels and comprises conventional inverters, AND, OR, and NAND circuits.

7. An encoder as set forth in claim 5 wherein said logic circuit means performs a mapping function to map the input vector X and the state vector Y into the output channel vector Z and the next-state vector Y' according to the mapping function table:

| X<br>Y | 0 | 1 | 2 | 3 |
|---|---|---|---|---|
| 0 | 1/1 | 3/1 | 4/0 | 6/0 |
| 1 | 1/1 | 3/1 | 4/2 | 6/2 |
| 2 | 1/1 | 3/1 | 4/0 | 6/0 |
| 3 | 0/2 | 2/0 | 4/0 | 6/0 |

| X<br>Y | 0 | 1 | 2 | 3 |
|---|---|---|---|---|
| 4 | 1/5 | 3/5 | 4/2 | 6/2 |
| 5 | 0/0 | 2/0 | 4/0 | 6/0 |
| 6 | 0/2 | 2/4 | 4/4 | 6/4 |
| 7 | 0/0 | 2/0 | 4/0 | 6/0 |

FORMAT: Y'/Z

X = ($X_2X_1$) = INPUT VECTOR
Y = ($Y_3Y_2Y_1$) = STATE VECTOR
Y' = ($Y_3'Y_2'Y_1'$) = NEXT-STATE VECTOR = $\tau$ (X,Y)
Z = ($Z_1Z_2Z_3$) = OUTPUT VECTOR = $\omega$ (X,Y)

wherein the decimal values in said table represent the binary data gated into and produced by said logic circuit means and wherein, in the multibit binary vectors X, Y, Y' and Z, bits x2, y3, y3', and z1 are the most significant bits.

8. An encoding/decoding system for producing a run length limited (RLL) code for use in a structurally constrained environment, said code having a minimum of 1 and a maximum of seven 0's between adjacent 1's and a coding rate ⅔, said system including a lookahead encoder comprising means for receiving as an input vector (X) for a given encoding operation, 2 new message bits and a three bit state vector (Y) derived from the immediately preceding encoding operation, logic circuit means for producing a three bit constrained channel vector (Z) obeying said RLL coding rules and a three bit next-state vector (Y') which becomes the state vector (Y) for use in the next encoding operation, said logic circuit means producing a channel vector Z as a direct function of the two current input bits and the immediately preceding two input bits to the encoder logic circuit means and producing the next-state vector as a catenation of the two current input bits and the least significant bit (z3) of the current channel vector (Z), said system including a decoder for receiving a three bit input vector (X) for a given decoding operation and a 6 bit state vector Y derived from the immediately preceding decoding operation, which comprises logic circuit means for producing a two bit unconstrained output vector (Z) and a 6 bit next-state vector Y' which becomes the state vector Y for use in the next decoding operation, said logic circuit means producing the output vector Z as a function of the state vector Y and the input vector (X) and producing the next-state vector Y' as a catenation of the input vector (X) and a portion of the state vector (Y).

9. An encoding/decoding system as set forth in claim 8 wherein said encoder logic circuit means performs a mapping function to map the two input vectors X and Y into the two output vectors Z and Y' according to the mapping function table:

FORMAT: Y'/Z

| Y \ X | 0 | 1 | 2 | 3 |
|---|---|---|---|---|
| 0 | 1/1 | 3/1 | 4/0 | 6/0 |
| 1 | 1/1 | 3/1 | 4/2 | 6/2 |
| 2 | 1/1 | 3/1 | 4/0 | 6/0 |
| 3 | 0/2 | 2/0 | 4/0 | 6/0 |
| 4 | 1/5 | 3/5 | 4/2 | 6/2 |
| 5 | 0/0 | 2/0 | 4/0 | 6/0 |
| 6 | 0/2 | 2/4 | 4/4 | 6/4 |
| 7 | 0/0 | 2/0 | 4/0 | 6/0 |

$X = (X_2 X_1)$ = INPUT VECTOR
$Y = (Y_3 Y_2 Y_1)$ = STATE VECTOR
$Y' = (Y_3' Y_2' Y_1')$ = NEXT-STATE VECTOR = $\tau(X,Y)$
$Z = (Z_1 Z_2 Z_3)$ = OUTPUT VECTOR = $\omega(X,Y)$ the decimal values in said table being representative of the data content in binary form gated into and generated by said encoder logic circuit means, and wherein in the multibit vectors Y, Y' and Z, bits y2, y2', and z1 are the most significant bits, and wherein the decoder logic circuit means performs a mapping function to map the input vector X and state vector Y into the output vector Z and the next-state vector Y' according to the two mapping function tables:

FORMAT: Y'

| | X | | | | | | | |
|---|---|---|---|---|---|---|---|---|
| V | 0 | 1 | 2 | 3 | 4 | 5 | 6 | 7 |
| 0 | 0 | 8 | 16 | 24 | 32 | 40 | 48 | 56 |
| 1 | 1 | 9 | 17 | 25 | 33 | 41 | 49 | 57 |
| 2 | 2 | 10 | 18 | 26 | 34 | 42 | 50 | 58 |
| 3 | 3 | 11 | 19 | 27 | 35 | 43 | 51 | 59 |
| 4 | 4 | 12 | 20 | 28 | 36 | 44 | 52 | 60 |
| 5 | 5 | 13 | 21 | 29 | 37 | 45 | 53 | 61 |
| 6 | 6 | 14 | 22 | 30 | 38 | 46 | 54 | 62 |
| 7 | 7 | 15 | 23 | 31 | 39 | 47 | 55 | 63 |

$X = (x3\ x2\ x1)$  $V = (y6\ y5\ y4)$
$Y' = (x3\ x2\ x1, y6\ y5\ y4) = \tau(X,V) = X,V$

NEXT-STATE TABLE

| Y | | | | | | X | | | Z | |
|---|---|---|---|---|---|---|---|---|---|---|
| Y1 | Y2 | Y3 | Y4 | Y5 | Y6 | X1 | X2 | X3 | Z1 | Z2 |
| d | 1 | 0 | 0 | 0 | 0 | d | d | d | 0 | 0 |
| d | 0 | 0 | 0 | 0 | 0 | d | d | d | 0 | 1 |
| d | d | d | 1 | 0 | 0 | d | d | d | 1 | 1 |
| d | d | 0 | 0 | 0 | 0 | $\overline{0\ 0}$ | | d | 1 | 0 |
| d | d | 0 | 0 | 1 | 0 | 0 | 0 | d | 1 | 0 |
| d | d | d | 1 | 0 | 1 | d | d | d | 1 | 0 |
| d | 0 | 0 | 0 | 0 | 1 | d | d | d | 0 | 1 |
| d | 1 | 0 | 0 | 0 | 1 | d | d | d | 0 | 0 |
| d | d | 1 | 0 | 0 | 1 | d | d | d | 0 | 0 |
| d | d | 1 | 0 | 1 | 0 | $\overline{0\ 0}$ | | d | 0 | 0 |
| d | d | 1 | 0 | 1 | 0 | 0 | 0 | d | 0 | 1 |
| d | d | 1 | 0 | 0 | 0 | d | d | d | 0 | 1 |

$Z = \omega(X, Y)$
$d$ = don't care
$\overline{00}$ = not 00

OUTPUT TABLE the decimal values in said tables being representative of the data content in binary form, gated into and generated by said encoder logic circuit means, and wherein in the multibit vectors X, Y, Y' and Z, bits x3, y6, y6' and z2 are the most significant bits.

* * * * *